US009042208B1

(12) United States Patent
Knigge et al.

(10) Patent No.: US 9,042,208 B1
(45) Date of Patent: May 26, 2015

(54) DISK DRIVE MEASURING FLY HEIGHT BY APPLYING A BIAS VOLTAGE TO AN ELECTRICALLY INSULATED WRITE COMPONENT OF A HEAD

(71) Applicant: Western Digital Technologies, Inc., Irvine, CA (US)

(72) Inventors: Bernhard E. Knigge, San Jose, CA (US); Jian Xu, San Jose, CA (US); Lisha Wang, Fremont, CA (US); Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/794,771

(22) Filed: Mar. 11, 2013

(51) Int. Cl.
*G11B 11/00* (2006.01)
*G11B 21/21* (2006.01)

(52) U.S. Cl.
CPC ...................................... *G11B 21/21* (2013.01)

(58) Field of Classification Search
USPC ................... 369/13.33, 13.13, 13.32; 360/75
See application file for complete search history.

(56) References Cited

U.S. PATENT DOCUMENTS

| | | | |
|---|---|---|---|
| 4,479,090 A * | 10/1984 | Frater et al. ................... | 324/454 |
| 4,931,887 A | 6/1990 | Hegde et al. | |
| 5,070,302 A | 12/1991 | Marcus et al. | |
| 5,153,785 A * | 10/1992 | Muranushi et al. ............. | 360/75 |
| 5,168,483 A | 12/1992 | Oka et al. | |
| 5,377,058 A * | 12/1994 | Good et al. ..................... | 360/75 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,596 A | 4/2000 | Schaenzer et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |

(Continued)

FOREIGN PATENT DOCUMENTS

| | | |
|---|---|---|
| WO | WO 03/019559 A1 | 3/2003 |
| WO | WO 2005/077043 A2 | 8/2005 |
| WO | WO 2005/077043 A3 | 8/2005 |

OTHER PUBLICATIONS

Knigge, et al., "Influence of Contact Potential on Slider-Disk Spacing: Simulation and Experiment", IEEE Transactions on Magnetics, vol. 40, No. 4, Jul. 2004, pp. 3165-3167.

*Primary Examiner* — Tan X Dinh (57) ABSTRACT

A disk drive is disclosed comprising a disk, and a slider comprising a head, where the head comprises a write component electrically insulated from the slider. A bias voltage is applied to the write component, and a current flowing between the write component and the disk is measured, wherein the current is indicative of a fly height of the head.

24 Claims, 7 Drawing Sheets

(56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,746 B1 * | 3/2002 | Kakekado et al. ............... 360/75 |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,501,606 B2 | 12/2002 | Boutaghou et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,529,342 B1 | 3/2003 | Feng et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,607 B2 | 12/2003 | Stein |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,089 B1 | 8/2004 | Bonin et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,876,509 B2 | 4/2005 | Bonin et al. |
| 6,879,464 B2 | 4/2005 | Sun et al. |
| 6,888,184 B1 | 5/2005 | Shi et al. |
| 6,888,693 B2 | 5/2005 | Boutaghou et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,805 B1 * | 11/2005 | Hanchi et al. .................. 360/75 |
| 6,969,989 B1 | 11/2005 | Mei |
| 6,975,486 B2 | 12/2005 | Chen et al. |
| 6,980,383 B2 | 12/2005 | Brunnett et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,777 B1 | 3/2006 | Hirano et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,068,449 B2 | 6/2006 | Riddering et al. |
| 7,068,457 B2 * | 6/2006 | Riddering et al. ............... 360/75 |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,305 B2 | 10/2007 | Kwon et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,197 B2 | 12/2007 | Baumgart et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,394,611 B1 | 7/2008 | Rahgozar |

(56) References Cited

U.S. PATENT DOCUMENTS

| | | |
|---|---|---|
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,450,333 B2 | 11/2008 | Hirano et al. |
| 7,450,335 B2 | 11/2008 | Hirano et al. |
| 7,468,856 B2 * | 12/2008 | Fitzpatrick et al. ............ 360/75 |
| 7,489,466 B2 | 2/2009 | Knigge et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,679,857 B2 | 3/2010 | Zhu et al. |
| 7,684,160 B1 | 3/2010 | Erickson et al. |
| 7,688,546 B1 | 3/2010 | Bai et al. |
| 7,691,434 B1 | 4/2010 | Zhang et al. |
| 7,692,897 B2 | 4/2010 | Edelman et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,079 B1 | 6/2010 | Huber |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,830,634 B2 | 11/2010 | Chen et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,952,829 B2 | 5/2011 | Ionescu |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,306 B2 * | 3/2012 | Feng et al. ..................... 360/75 |
| 8,139,309 B2 | 3/2012 | Knigge et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,247,095 B2 | 8/2012 | Champion et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,274,751 B2 | 9/2012 | Feng et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |

(56) References Cited

U.S. PATENT DOCUMENTS

| | | |
|---|---|---|
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,512 B2 | 12/2013 | Hogg |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,442 B2 | 3/2014 | Hogg |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2004/0085686 A1* | 5/2004 | Krounbi et al. ............ 360/317 |
| 2005/0174665 A1* | 8/2005 | Zhang et al. ............... 360/25 |
| 2005/0174667 A1* | 8/2005 | Feng et al. ................. 360/31 |
| 2006/0158769 A1* | 7/2006 | Ono et al. .................. 360/75 |
| 2009/0257145 A1* | 10/2009 | Tsuyama .................... 360/75 |
| 2010/0020439 A1 | 1/2010 | Watanabe |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0201108 A1 | 8/2012 | Zheng et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0043707 A1* | 2/2014 | Tomikawa et al. ......... 369/13.32 |

* cited by examiner

DISK DRIVE MEASURING FLY HEIGHT BY APPLYING A BIAS VOLTAGE TO AN ELECTRICALLY INSULATED WRITE COMPONENT OF A HEAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

The head is typically fabricated on a slider which is coupled to the actuator arm through a suspension that biases the slider toward the disk surface. The slider comprises an air-bearing surface (ABS) wherein as the disk rotates, an air-bearing is formed between the slider and the disk that counteracts the bias force of the suspension. Accordingly, the head essentially flies just above the disk surface during write/read operations. Data is typically written to the disk by modulating a write current in an inductive coil of the head to record magnetic transitions onto the disk surface in a process referred to as saturation recording. During readback, the magnetic transitions are sensed by a read element (e.g., a magnetoresistive element) of the head and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Since the quality of the write/read signal depends on the fly height of the head, conventional heads may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

DETAILED DESCRIPTION

Figure 1A:
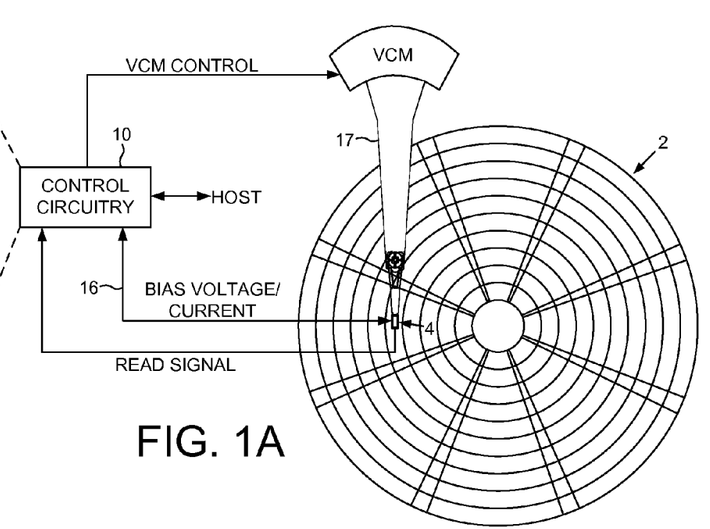
FIG. 1A shows a disk drive according to an embodiment comprising a head actuated over a disk.

FIG. 1A shows a disk drive according to an embodiment comprising a disk 2 and a slider 4 (FIG. 1B) including a head 6, wherein the head 6 comprises a write component 8 electrically insulated from the slider 4. The disk drive further comprises control circuitry 10 operable to execute the flow diagram of FIG. 1C, wherein a bias voltage is applied to the write component (block 12), and a current flowing between the write component and the disk is measured (block 14), wherein the current is indicative of a fly height of the head.

Figure 1B:
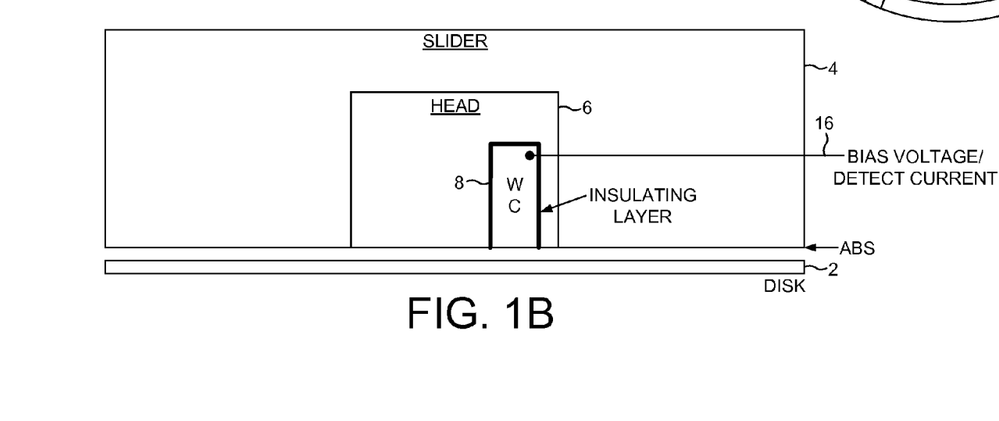
FIG. 1B shows an embodiment of a head comprising a slider including a write component electrically insulated from the slider.
Figure 1C:
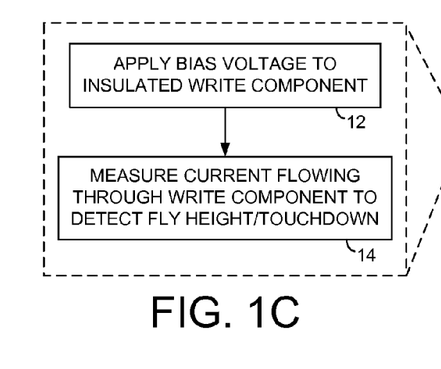
FIG. 1C is a flow diagram according to an embodiment wherein a bias voltage is applied to the write component, and a current flowing through the write component is measured to measure a fly height and/or detect touchdown of the head.

In the embodiment of FIG. 1B, the slider 4 is fabricated with a lead 16 that is connected to the write component 8 at a first end, and connected at a second to a preamp circuit (not shown) mounted, for example, on an actuator arm 17 of the disk drive. The lead 16 may be routed to the preamp circuit using a suitable flex circuit. The preamp circuit applies a bias voltage to the lead 16 as well as senses the current flowing through the lead 16 in order to measure the current flowing between the write component 8 and the disk 2. In the embodiment shown in FIG. 1B, the head is fabricated with a suitable insulating layer that electrically insulates the write component 8 from the rest of head 6 (and therefore from the slider 4) so that the current flowing between the write component 8 and the disk 2 may be more accurately measured.

The prior art has suggested to measure the current (e.g., tribocurrent) flowing between the slider 4 and the disk surface 2 in order to measure a fly height of the head and/or detect the head 4 touching down onto the disk 2. However, energizing the entire slider 4 with a bias voltage and measuring the resulting current flow may not provide an accurate measurement of the fly height and/or touchdown for a number of reasons. For example, when a large surface area at the ABS such as the entire slider is energized with a bias voltage, it may cause electrostatic attraction between the slider and the disk, thereby modifying the fly height. Energizing a large surface such as the entire slider may also increase leakage current which cannot be distinguished from current flowing from the disk and therefore obfuscates the fly height measurement.

To overcome the drawbacks of energizing the entire slider 4 (or a large portion of the slider 4), in the embodiments of the present invention only a relatively small write component 8 is energized with a bias voltage. Evaluating only a small write component 8 of the head still provides an accurate estimate of the fly height and/or touchdown since it is the write component 8 that will typically protrude toward the disk during a write operation. In one embodiment, when calibrating the control signal applied to a dynamic fly height actuator fabricated into the head (e.g., a heater), the calibration procedure is executed during a write operation (and/or with a laser on) so that the write component 8 provides the fly height measurement feedback.

Any suitable head 4 may be employed in the embodiments of the present invention, such as a head used in longitudinal magnetic recording or a head used in perpendicular magnetic recording. In another embodiment, the head 4 may be used in what is referred to as heat assisted magnetic recording (HAMR) wherein the head comprises a suitable laser (e.g., a laser diode) together with suitable optics that focus the light emitted by the laser onto the surface of the disk during a write operation. The light heats the surface of the disk which reduces the coercivity, thereby enabling the disk surface to be more readily magnetized during the write operation. Any suitable write component 8 may be energized with a bias voltage in order to monitor the fly height of the head 4 as described in greater detail below, such as a write pole, a write pad, or a near field transducer (NFT) of a HAMR head.

Figure 2:
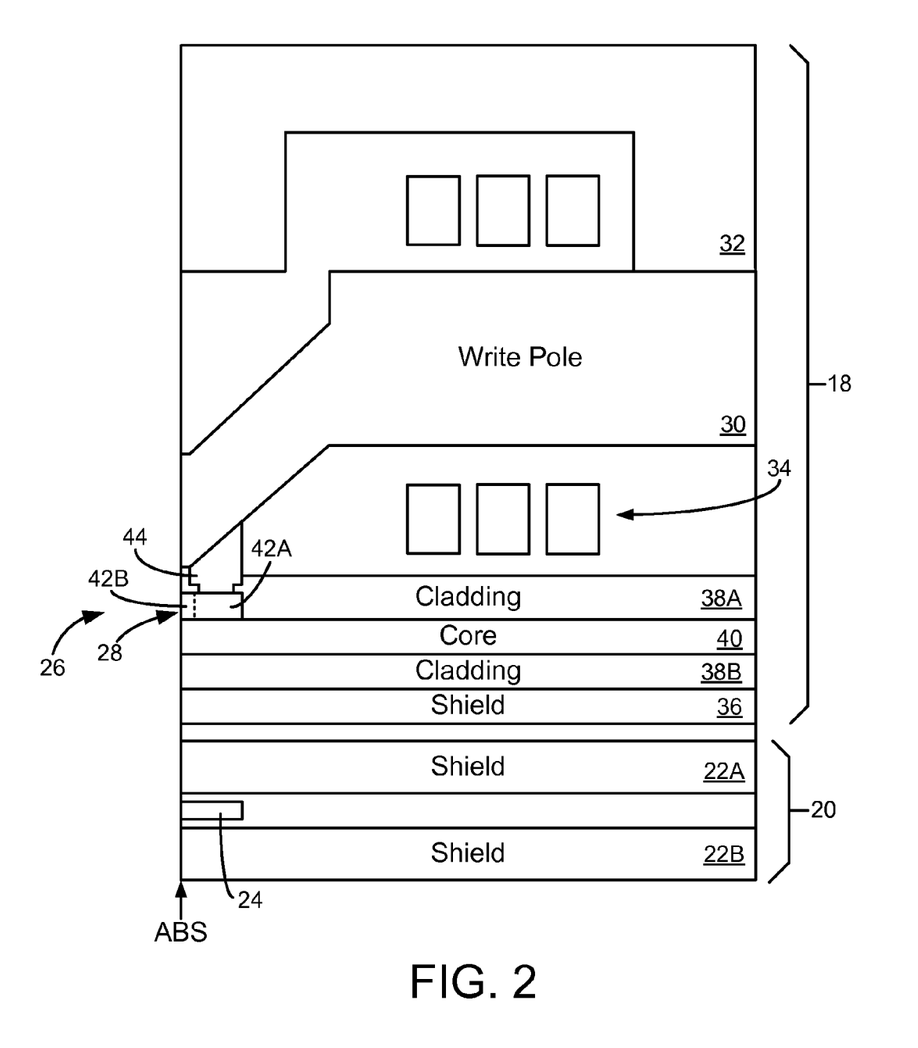
FIG. 2 shows a head according to an embodiment comprising a write shield, a write pole, a near field transducer (NFT), and a read element.

FIG. 2 shows an embodiment of a HAMR head according to an embodiment comprising write components 18 and read components 20. For clarity, FIG. 2 is not to scale, and not all components of the head are shown. In addition, although the HAMR head is shown in the context of particular components, other and/or different components may be used. Further, the arrangement of components may vary in different embodiments. The HAMR head of FIG. 2 comprises suitable optics for focusing the light emitted by a laser onto the disk surface, but these components would not be included in embodiments employing a non-HAMR type head.

The read components 20 of the HAMR head shown in FIG. 2 include shields 22A and 22B and a suitable read element 24. In some embodiment, the read element 24 may be a magnetoresistive element, such as a spin tunneling junction element. However, in other embodiments, another type of read element may be used. The write components 18 of the HAMR head shown in FIG. 2 include a waveguide 26, a NFT 28, a write pole 30, a write shield 32, write coil(s) 34, and shield 36. The write components 18 may also include a grating (not shown) that is used to couple light from the laser (not shown) to the waveguide 26. In one embodiment, the write pole 30 may be electrically conductive with the write shield 32, and in another embodiment described below, the write pole 30 may be electrically insulated form the write shield 32 using a suitable insulating layer.

During a write operation, a write current is passed through the coil(s) 34 so that the write pole 30 generates a magnetic field for magnetizing the disk surface. The waveguide 26 focus light emitted by the laser to the ABS and more specifically to the NFT 28. The waveguide 26 includes cladding 38A and 38B as well as core 40. The NFT 28 is optically coupled with the waveguide 26, focusing the light from the core 40 into a small spot at the ABS. In the embodiment shown in FIG. 2, the NFT 28 comprises a disk 42A and a pin 42B at the ABS. The disk 42A extends further in the track width direction (perpendicular to the plane of the page in FIG. 2) than the pin 42B. Although termed a disk, the disk 42A of the NFT 28 need not be disk-shaped. For example, instead of having a circular footprint, the disk 42A may be square, rectangular, or have another shape. The write pole 30 is configured to write to the region of the disk surface heated by the NFT 28. In the embodiment of FIG. 2, a portion of the bottom surface of the write pole 30 slopes away from the NFT 28. A heat sink 44 is thermally coupled at its bottom with the NFT 28 and at its top with the sloped surface of the write pole 30. In some embodiments, the heat sink 44 has the same footprint as the disk portion 42A of the NFT 28. In some embodiments, therefore, the heat sink 44 may have a cylindrical cross-section. In general, the width of the heat sink 44 may be smaller than that of the NFT 28. In one embodiment, the NFT 28 may be electrically conductive with the write pole 30 through the heat sink 44, and in another embodiment described below, the NFT 28 may be electrically insulated from the write pole 30 using a suitable insulating layer.

During a write operation, one or more of the write components may protrude toward the disk surface due to thermal expansion. For example, the energy applied to the write pole 30 by the coil(s) 34 may heat the write pole 30 causing it to protrude toward the disk surface. Similarly, the energy applied to the NFT 28 by the laser may heat the NFT 28 causing it to protrude toward the disk surface. In another embodiment described below, the head may comprise a write pad that may be heated by another write component (e.g., the write pole 30) causing the write pad to protrude toward the disk surface. Accordingly, in embodiments of the present invention the protrusion of the write component toward the disk surface increases a current flowing between the disk surface and the write component, wherein the increase in current may be detected and transduced into a fly height measurement and/or a touchdown indicator.

Figure 3:
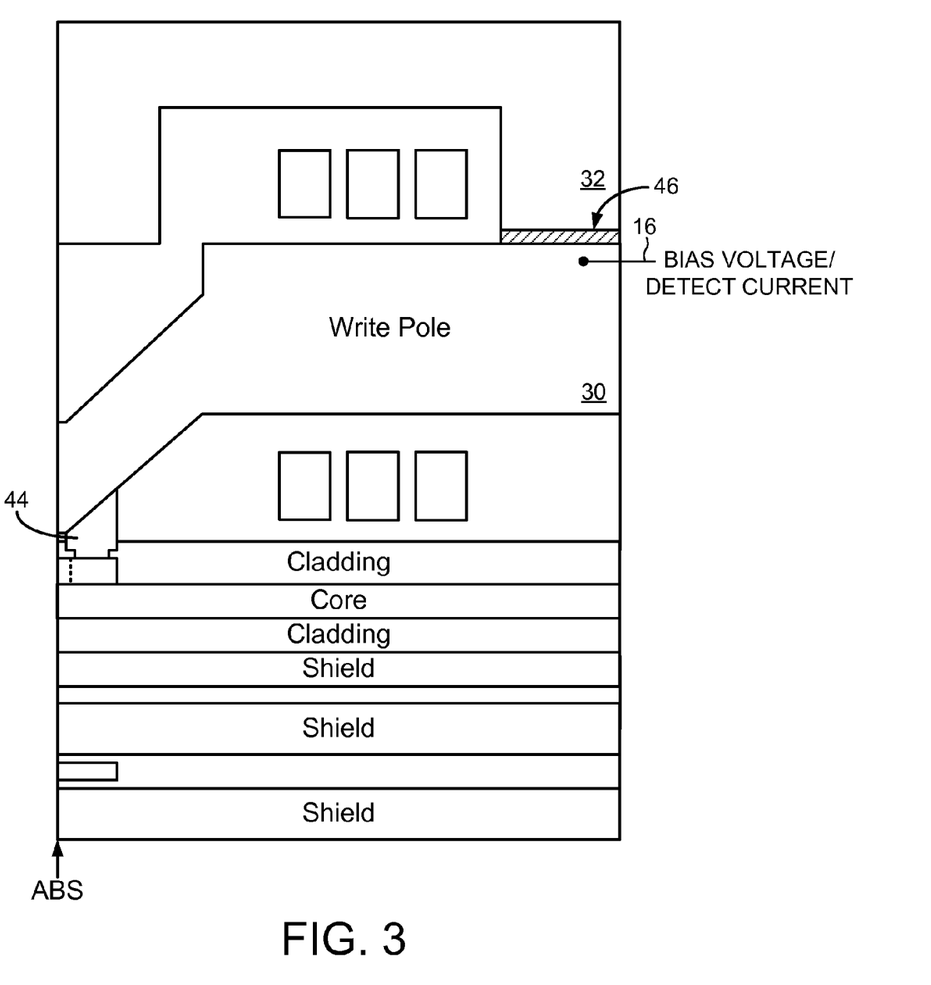
FIG. 3 shows a head according to an embodiment wherein the write component comprises a write pole that is electrically insulated from a write shield.

FIG. 3 shows an embodiment of a head wherein the write component 8 that is electrically insulated from the slider 4 in FIG. 1B comprises the write pole 30. In the embodiment of FIG. 3, the head is fabricated with an insulating layer 46 that electrically insulates the write pole 30 from the write shield 32, and therefore also electrically insulates the write pole 30 from the slider 4. A lead 16 connects the write pole 30 to the preamp which applies a bias voltage to the write pole 30 and measures the current flowing between the disk and the write pole 30. During a write operation, the write current flowing through the coil(s) 34 causes the write pole 30 to protrude toward the disk surface due to thermal expansion, and the reduced fly height (and/or touchdown) is detected based on the increased current flowing through the lead 16 back to the preamp. In another embodiment, the head shown in FIG. 3 may also be fabricated with an insulating layer between the heat sink 44 and the write pole 30 so as to electrically insulate the write pole 30 from the optical components of a HAMR head. Since the surface area of the write pole 30 at the ABS is relatively small, the bias voltage applied to the write pole 30 reduces the electrostatic attraction and leakage current as compared to energizing the entire area of the slider as in the prior art.

Figure 4:
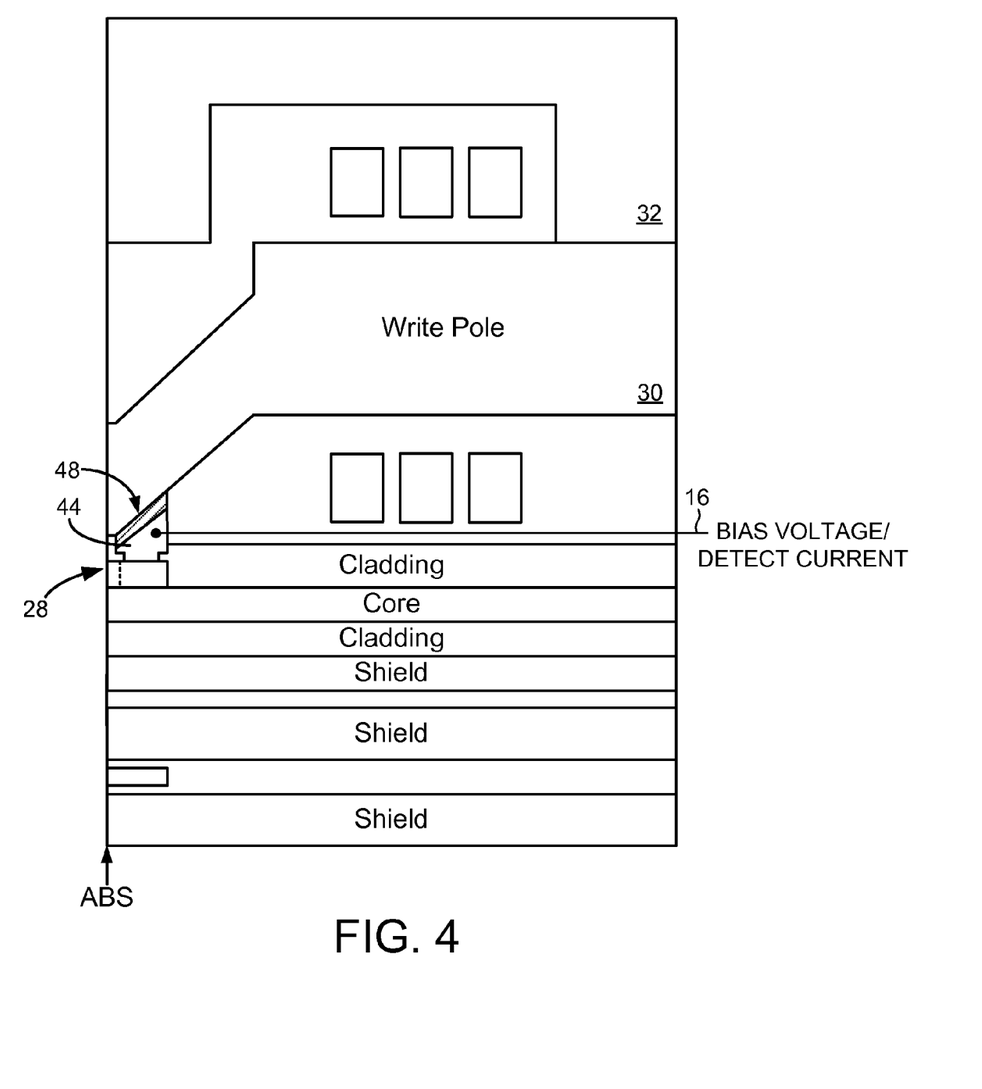
FIG. 4 shows a head according to an embodiment wherein the write component comprises a NFT electrically insulated from a write pole.

FIG. 4 shows an embodiment of a head wherein the write component 8 that is electrically insulated from the slider 4 in FIG. 1B comprises the NFT 28 of a HAMR head. In the embodiment of FIG. 4, the head is fabricated with an insulating layer 48 that electrically insulates the NFT 28 (at the heat sink 44) from the write pole 30, and therefore also electrically insulates the NFT 28 from the slider 4. A lead 16 connects the NFT 28 to the preamp which applies a bias voltage to the NFT 28 and measures the current flowing between the disk and the NFT 28. During a write operation, the energy generated by the laser causes the NFT 28 to protrude toward the disk surface due to thermal expansion, and the reduced fly height (and/or touchdown) is detected based on the increased current flowing through the lead 16 back to the preamp. Since the surface area of the NFT 28 at the ABS is very small (significantly smaller than even the write pole 20), the electrostatic attraction and leakage current are reduced even further.

Figure 5A:
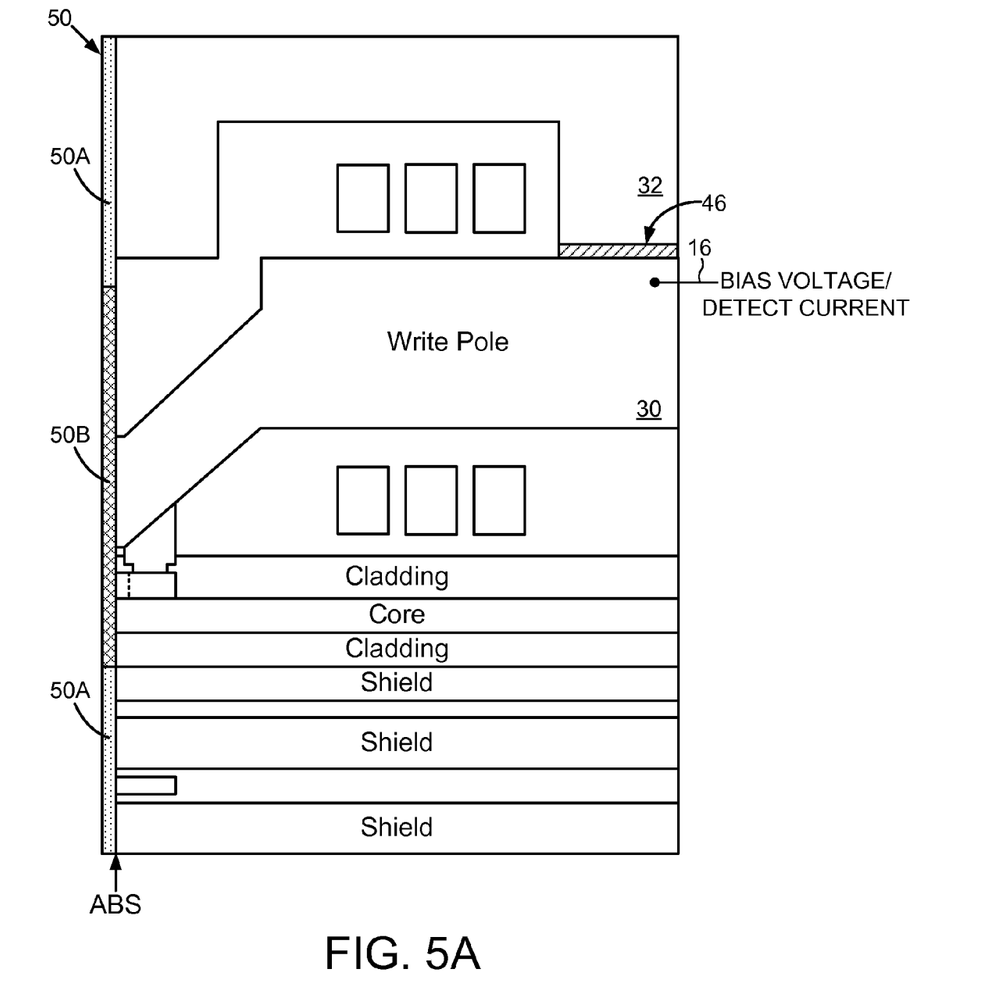
FIG. 5A shows a head according to an embodiment wherein a coating is modified by increasing the conductivity proximate the write component to improve a conductivity of the write component relative to the disk.

FIG. 5A shows an embodiment of a head wherein a suitable coating 50 (e.g., a diamond-like carbon (DLC) coating) covers at least part of the ABS, wherein the coating 50 is modified proximate the write component 8 (e.g., write pole 30) that is electrically insulated from the slider 4 to improve a conductivity of the write component 8 relative to the disk. In one embodiment, the coating 50 is modified by increasing the conductivity of the coating 50B that covers the write component 8. For example, the coating 50B that covers the write component 8 may comprise a silicon (Si) doped DLC coating which exhibits a relatively high conductivity, whereas the coating 50A at the boundary of this area may comprise a silicon-nitride ($Si_3N_4$) doped DLC coating which is electrically insulative. In this manner, when the write component 8 (e.g., write pole 30) protrudes toward the disk surface during a write operation, the higher conductivity of the coating 50B improves the conductivity of the write component 8 relative to the disk surface, thereby improving the fly height and/or touchdown measurement.

Figure 5B:
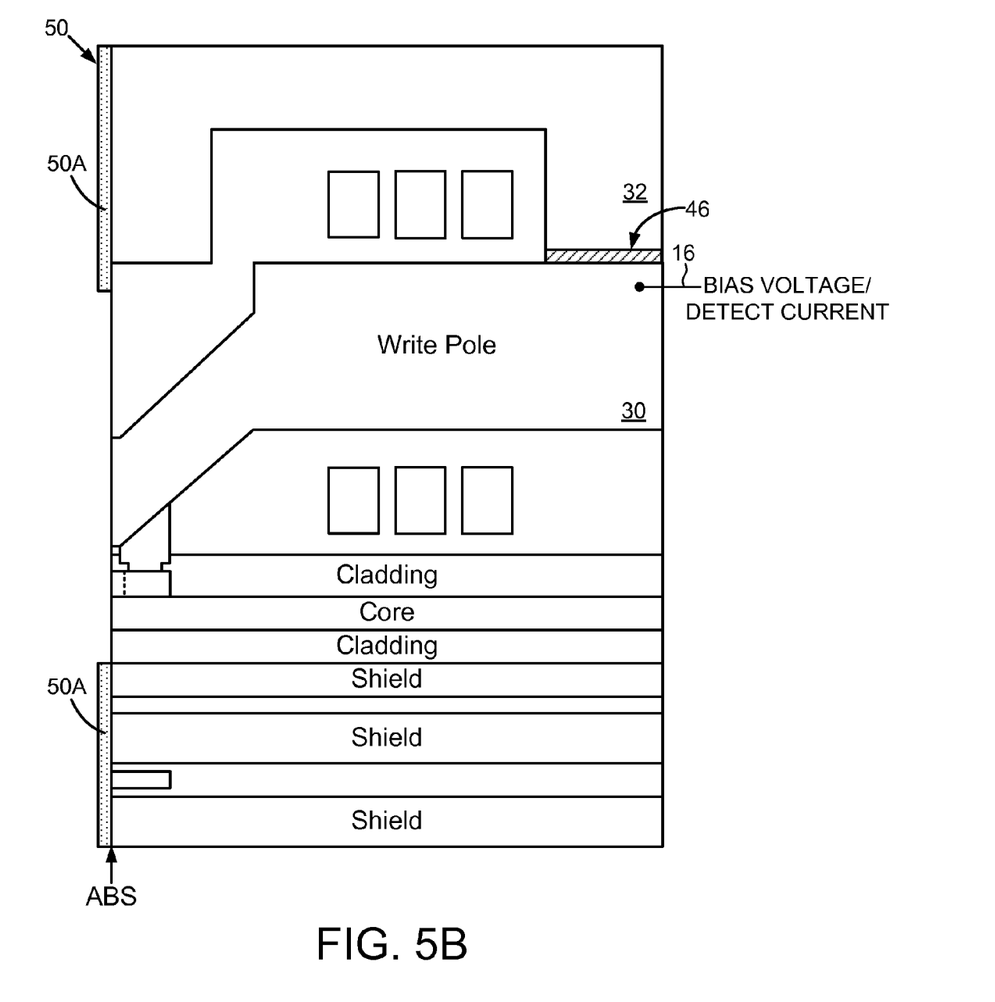
FIG. 5B shows a head according to an embodiment wherein the coating proximate the write component is depleted to improve a conductivity of the write component relative to the disk.

FIG. 5B shows another embodiment of a head wherein the coating 50 is modified proximate the write component 8 (e.g., the write pole 30) by at least partially depleting the coating 50. In the embodiment shown in FIG. 5B, the coating 50 may be formed with an electrically insulative material (e.g., $Si_3N_4$ doped DLC) so that the undepleted sections of the coating 50A helps reduce leakage current. In this embodiment, depleting (or completely removing) the coating 50 proximate the write component 8 helps improve the conductivity of the write component 8 relative to the disk surface, thereby improving the fly height and/or touchdown measurement.

The coating 50 may be modified in the embodiments of FIGS. 5A and 5B proximate the write component 8 using any suitable technique. For example, in one embodiment a suitable etching technique may be employed to fabricate the coating 50 having a different conductivity proximate the write component 8 as in FIG. 5A, or to at least partially deplete an insulative coating 50 covering the write component as in FIG. 5B.

Figure 6A:
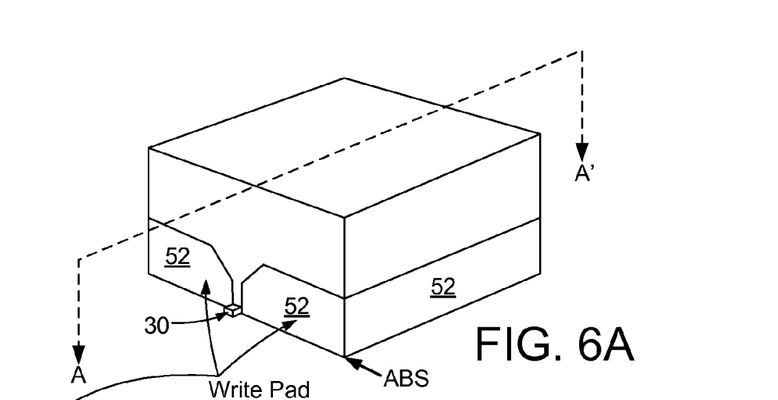
FIG. 6A shows a perspective view of a head according to an embodiment comprising a write pad.
Figure 6B:
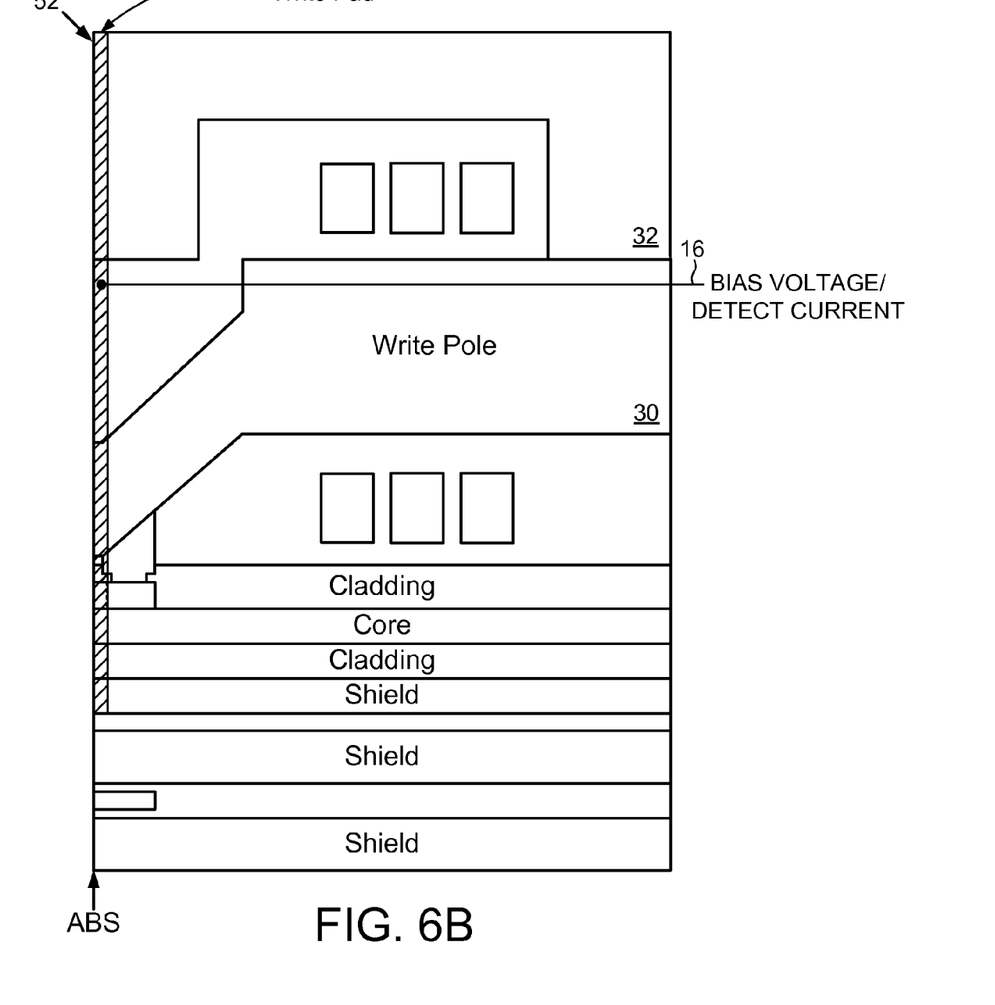
FIG. 6B shows a cross-sectional view of the head of FIG. 6A, including the write pad.

FIG. 6A shows a perspective view of a head according to an embodiment, wherein FIG. 6B shows a cross-sectional view of the head along plane A-A' of FIG. 6A. The head shown in FIG. 6A is simplified for clarity, showing only the components relevant to an embodiment where the write component 8 of FIG. 1B comprises a write pad 52. In one embodiment, the head is fabricated so that there is a physical separation between the write pad 52 and other write components. For example, in one embodiment the write pad 52 is separated from the write pole 30 and write shield 32 by at least 0.5 um. In addition, the write pad 52 may be electrically insulated from the other write components as well as from the slider 4 using any suitable insulating layers. In one embodiment, the write pad 52 is fabricated with a material having a relatively large coefficient of thermal expansion as compared to the other write components. In one embodiment, during a write operation the energy applied to the write pole 30 by the write current also transfers heat to the write pad 52 (e.g., conductively and/or radiantly), thereby causing the write pad 52 to protrude faster toward the disk surface than the other write components. A lead 16 is applied to the write pad 52 in order to apply the bias voltage and measure the current flowing between the write pad 52 and the disk, thereby measuring the fly height and/or detecting touchdown of the head.

Any suitable bias voltage may be applied to the write component 8 over lead 16 in FIG. 1B, including a DC or AC bias voltage. In one embodiment, the bias voltage comprises a negative bias voltage which may help counteract a corrosion potential of the write component 8 and/or help reduce lube pickup. In addition, a negative bias voltage applied to the write component 8 may help maintain lube coverage, and thereby reduce burnishing of the head.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a slider comprising a head, the head comprising a write component electrically insulated from the slider; and
   control circuitry operable to:
      apply a bias voltage to the write component; and
      measure a current flowing between the write component and the disk, wherein the current is indicative of a fly height of the head.

2. The disk drive as recited in claim 1, wherein the write component comprises a write pole.

3. The disk drive as recited in claim 2, wherein the write pole is electrically insulated from a shield by an insulating layer.

4. The disk drive as recited in claim 1, wherein:
   the head comprises a laser operable to generate a light for heating the disk during a write operation; and the write component comprises an optical component operable to focus the light onto the disk.

5. The disk drive as recited in claim 4, wherein the optical component comprises a near field transducer.

6. The disk drive as recited in claim 5, wherein the near field transducer is electrically insulated from a write pole by an insulating layer.

7. The disk drive as recited in claim 1, wherein the write component comprises a write pad proximate a write pole.

8. The disk drive as recited in claim 1, wherein:
the slider comprises an air bearing surface (ABS) proximate the disk;
a coating covers at least part of the ABS; and
the coating is modified proximate the write component to improve a conductivity of the write component relative to the disk.

9. The disk drive as recited in claim 8, wherein a conductivity of the coating is increased proximate the write component.

10. The disk drive as recited in claim 8, wherein the coating is at least partially depleted proximate the write component.

11. The disk drive as recited in claim 1, wherein the bias voltage comprises a negative bias voltage.

12. The disk drive as recited in claim 1, wherein:
the bias voltage is applied to the write component over a lead; and
the current flowing between the write component and the disk is measured by measuring the current flowing through the lead.

13. A method of operating a disk drive comprising a disk, and a slider comprising a head, the head comprising a write component electrically insulated from the slider, the method comprising:
applying a bias voltage to the write component; and
measuring a current flowing between the write component and the disk, wherein the current is indicative of a fly height of the head.

14. The method as recited in claim 13, wherein the write component comprises a write pole.

15. The method as recited in claim 14, wherein the write pole is electrically insulated from a shield by an insulating layer.

16. The method as recited in claim 13, wherein:
the head comprises a laser operable to generate a light for heating the disk during a write operation; and
the write component comprises an optical component operable to focus the light onto the disk.

17. The method as recited in claim 16, wherein the optical component comprises a near field transducer.

18. The method as recited in claim 17, wherein the near field transducer is electrically insulated from a write pole by an insulating layer.

19. The method as recited in claim 13, wherein the write component comprises a write pad proximate a write pole.

20. The method as recited in claim 13, wherein:
the slider comprises an air bearing surface (ABS) proximate the disk;
a coating covers at least part of the ABS; and
the coating is modified proximate the write component to improve a conductivity of the write component relative to the disk.

21. The method as recited in claim 20, wherein a conductivity of the coating is increased proximate the write component.

22. The method as recited in claim 20, wherein the coating is at least partially depleted proximate the write component.

23. The method as recited in claim 13, wherein the bias voltage comprises a negative bias voltage.

24. The method as recited in claim 13, wherein:
the bias voltage is applied to the write component over a lead; and
the current flowing between the write component and the disk is measured by measuring the current flowing through the lead.

* * * * *